(12) United States Patent
Ion

(10) Patent No.: US 8,532,816 B2
(45) Date of Patent: Sep. 10, 2013

(54) TRUCK RESTRAINT FOR LOADING DOCK

(75) Inventor: Gregory Ion, Richmond Hill (CA)

(73) Assignee: Blue Giant Equipment Corporation, Brampton, Ontario (CA)

( * ) Notice: Subject to any disclaimer, the term of this patent is extended or adjusted under 35 U.S.C. 154(b) by 812 days.

(21) Appl. No.: 12/764,459

(22) Filed: Apr. 21, 2010

(65) Prior Publication Data
US 2011/0264270 A1    Oct. 27, 2011

(51) Int. Cl.
*G06F 7/00* (2006.01)
*G05B 15/00* (2006.01)
*G05D 23/00* (2006.01)
*B60R 9/00* (2006.01)
*B65B 21/02* (2006.01)
*B66F 9/18* (2006.01)

(52) U.S. Cl.
USPC ........... 700/213; 700/275; 700/302; 700/279; 414/401; 414/619; 224/506

(58) Field of Classification Search
None
See application file for complete search history.

(56) References Cited

U.S. PATENT DOCUMENTS

2007/0248440 A1 * 10/2007 Andersen et al. ............. 414/401

OTHER PUBLICATIONS

Office Action dated Jun. 13, 2012 received on the corresponding Canadian Patent Application No. 2737803.

* cited by examiner

*Primary Examiner* — Yolanda Jones
(74) *Attorney, Agent, or Firm* — Norton Rose Fulbright Canada LLP; Paul J. Field

(57) ABSTRACT

A device for restraining a horizontal bar at the rear of a vehicle to a stationary support adjacent a loading dock, the device having: a frame having a vertical track and a mounting bracket for securing the frame to the stationary support; a suspended carriage mounted to the track for vertical movement relative to the track, the suspended carriage having a forwardly and upwardly extending member.

19 Claims, 5 Drawing Sheets

TRUCK RESTRAINT FOR LOADING DOCK

TECHNICAL FIELD

The invention relates to a truck restraint for use in engaging the ICC bar or impact bumper of a truck that is backed up to a loading dock to prevent unwanted movement of the truck relative to the dock during loading and unloading operations.

BACKGROUND OF THE ART

Loading docks for trucks usually have an elevated dock floor surface approximately at the height of the average truck deck above the roadway surface. Trucks slowly back up to the dock at engage rubber bumpers on the dock to get as close as possible to the dock. Workers on the dock assist positioning on the truck with signals or red/green lights for example. Ramps, bridges or mechanical dock levelers are then positioned to bridge between the dock floor surface and the truck deck surface to enable wheeled vehicles to load and unload the truck.

The operation of wheeled vehicles such as fork lift trucks over such dock levelers exposes the operators to the risk of driving off the dock and plunging down with the forklift truck when the truck moves away from the dock. The truck may move due to failure of the brakes, sliding of the truck tires on the road surface, vibration causing slow gradual creeping movement caused by the forklift movements or driver error in driving away from the dock unexpectedly. Workers standing on the truck may also fall over due to such unintended movements of the truck. Air ride shock absorbers on the truck trailer may also cause unintended movements when the forklift bounces the truck bed and results in gradual movements away from the dock. For these reasons, safety regulations require some form of truck restraint to these prevent dangerous conditions from occurring due to movement of the truck.

To restrain movement of the truck relative to the dock, a common safety practice is to put chocks under the truck wheels. However wheel chocks alone are seldom adequate since slippery road surfaces can result in truck trailer movement. A more secure method is to mount a restraint device to the ground or wall surface adjacent the dock that engages the ICC bar of the truck or trailer. The ICC bar is a rear impact or under-ride guard that is mandated by government regulations and is common to large trucks usually in the form of two downward posts extending from the longitudinal truck chassis beams that support a horizontal beam known as an ICC bar. Of course if the ICC bar is broken, bent or damaged, wheel chocks may be used, however in a majority of cases properly functioning ICC bars can be used to secure the truck to the dock. The restraint device can be separate from the dock leveler device or combined together in a single unit. Restraint device may be mounted to the vertical wall of the loading dock or may be recessed into the roadway surface to extend upwardly to engage the ICC bar.

Conventional truck restraint devices engage the ICC bar with a hook or a stiff vertical bar. Truck beds are supported on the rear wheels with shock absorbers, metal springs or air ride shock absorbers. The movement of the forklift trucks when loaded can compress the truck suspension and cause difficulties in restraining the truck using the ICC bar which is usually about 2-4 inches thick. Therefore vertical movement of the truck suspension may cause disengagement of the truck restraint during loading and unloading.

Further, since the ICC bar is beneath the truck rear edge and dock workers are usually on the dock level above, visibility is limited to determine whether the ICC bar has actually been engaged properly or not. A worker would have to go to the ground level and look under the rear of the truck to visually inspect the restraint connection on the ICC bar. This is impractical especially in winter weather conditions, or in the dark and exposes the worker to several safety hazards walking on the roadway surface around moving trucks where drivers have limited visibility also. Closed circuit cameras may be used but are prone to impact damage in the loading dock environment.

Features that distinguish the present invention from the background art will be apparent from review of the disclosure, drawings and description of the invention presented below.

DISCLOSURE OF THE INVENTION

The invention provides a device for restraining a horizontal bar at the rear of a vehicle to a stationary support adjacent a loading dock, the device having: a frame having a vertical track and a mounting bracket for securing the frame to the stationary support; a suspended carriage mounted to the track for vertical movement relative to the track, the suspended carriage having a forwardly and upwardly extending member; a vertical motion actuator mounted to the frame and having: a master carriage slidably mounted to the suspended carriage, the master carriage engaging the suspended carriage for moving the suspended carriage between a lower retracted position and an upper engaged position wherein the member engages a forward surface of the horizontal bar; and a resilient suspension member disposed between the master carriage and the suspended carriage and having a resilient range of travel, whereby the suspended carriage is capable of vertically floating relative to the master carriage within the range of travel; a control system including: a suspended carriage position sensor on at least one of: the master carriage; and the suspended carriage for determining the position of the suspended carriage relative to the master carriage; and a processor in communication with the position sensor and the vertical motion actuator that: determines when the suspended carriage has engaged the horizontal bar by measuring the relative distance between the suspended carriage and the master carriage; and produces a signal command to the vertical motion actuator to move the master carriage relative to the suspended carriage by a predetermined distance.

DESCRIPTION OF THE DRAWINGS

In order that the invention may be readily understood, one embodiment of the invention is illustrated by way of example in the accompanying drawings.

Further details of the invention and its advantages will be apparent from the detailed description included below.

DETAILED DESCRIPTION OF PREFERRED EMBODIMENTS

Figure 1:
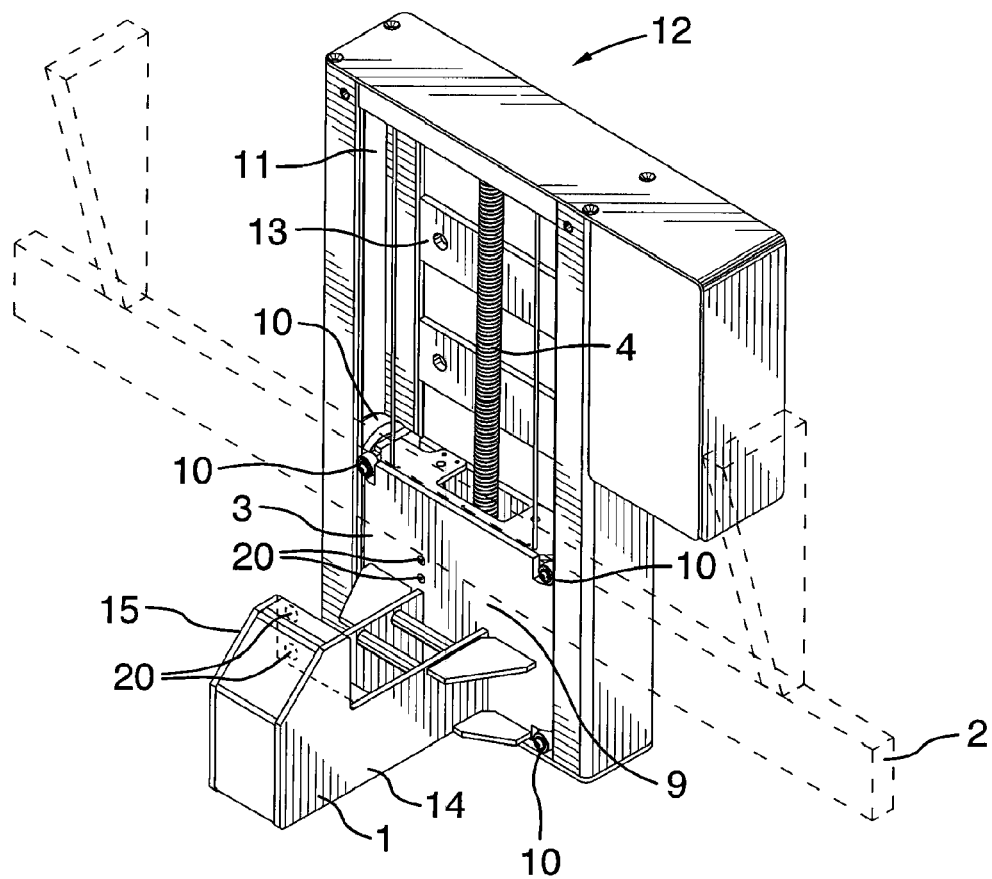
FIG. 1 is a front isometric view of a truck restraint device according to the invention adapted for mounting on a vertical wall of a loading dock (not shown) to engage an ICC bar (dashed outline) or rear truck impact bar of a truck where the restraint hook is in a retracted position.
Figure 2:
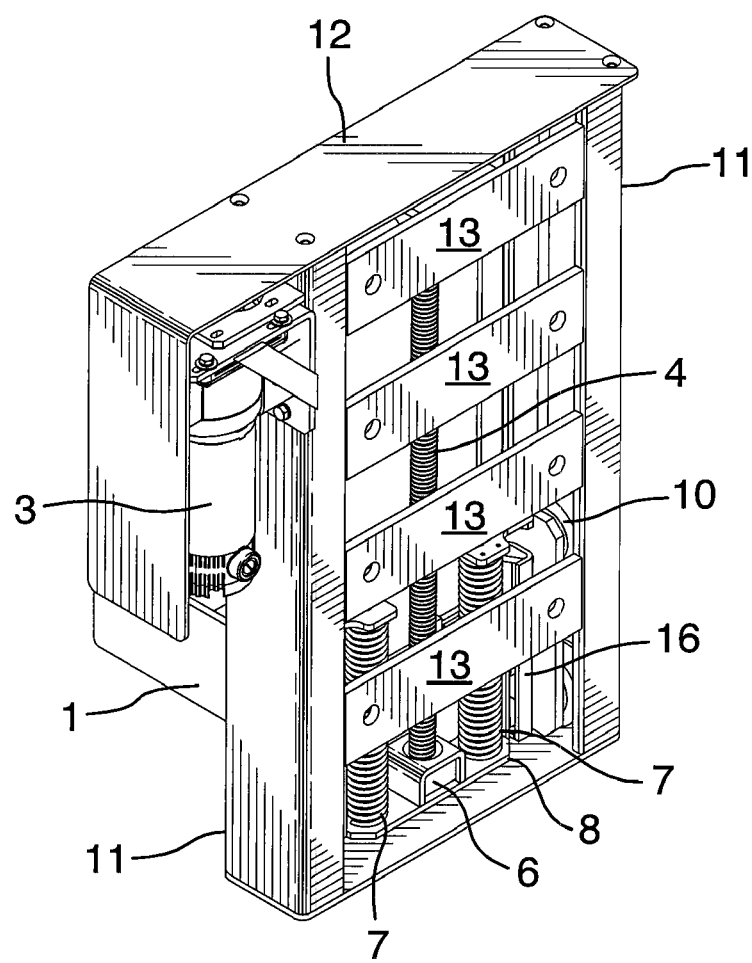
FIG. 2 is a rear isometric view of the truck restraint device of FIG. 1.
Figure 3:
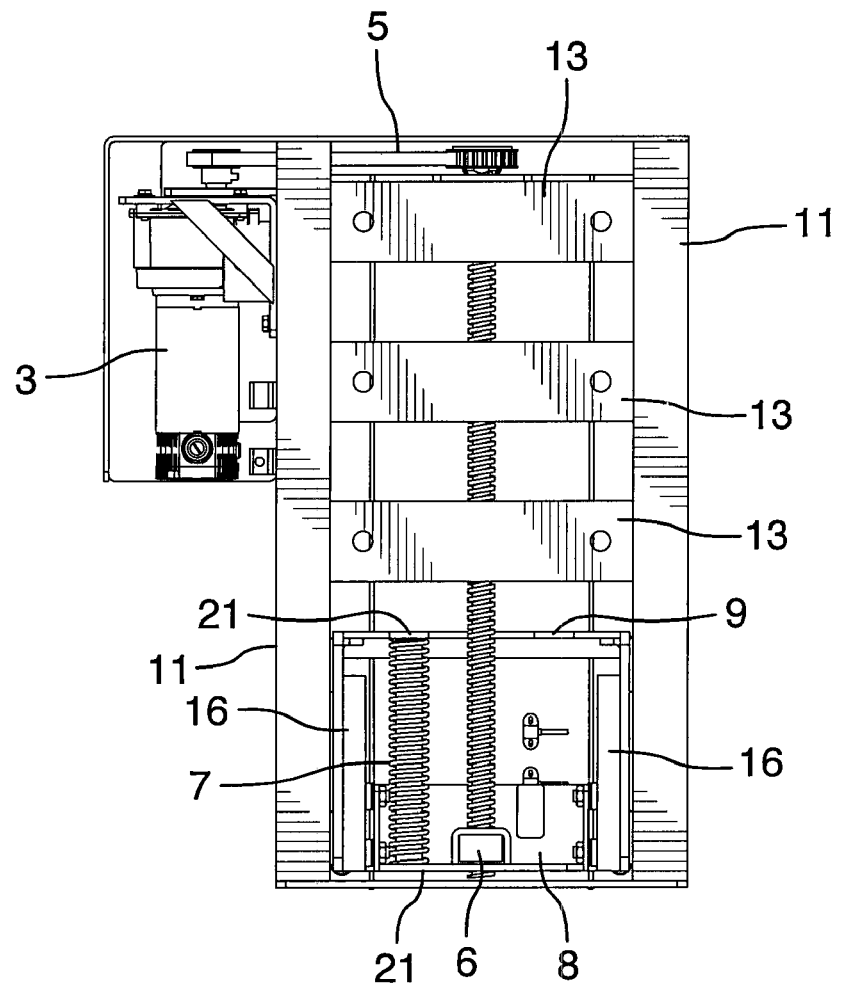
FIG. 3 is a rear view of the truck restraint device of FIG. 2 with the right side spring and a lower mounting bracket removed to clearly show the magnet and Hall effect sensors that determine the position of the suspended carriage relative to the master carriage.

FIGS. 1-3 show the general arrangement of the major components of the truck restraint device. As shown in FIG. 1, the truck (not shown) is restrained by vertically raising the hook 1 until the hook engages the underside and forward surface of the rectangular truck ICC bar 2. The ICC bar serves as a bumper and is required by government regulations to prevent vehicles of lower height such as cars from ramming into the rear of the truck and proceeding to go under the truck. The height of the ICC bar is approximately the height of a car front grill or bumper for this reason.

As shown in FIGS. 2-3, the hook 1 is raised and lowered using an electric motor 3 that rotates a threaded lead screw 4 via a drive belt 5. Rotation of the lead screw 4 in the nut 6, which is fixed to the master carriage 8 (FIG. 3), causes an upward force to be exerted on the base of the resilient spring 7. The top of the resilient spring then exerts an upward force on the suspended carriage 9.

As seen in FIGS. 1 and 3, the hook 1 is mounted to the front surface of the suspended carriage 9. The suspended carriage 9 has rollers 10 to vertically roll in C-shaped channel tracks 11 that form the vertical members of a frame 12. The frame 12 is vertically mounted to a wall with mounting brackets 13.

The device restrains the horizontal ICC bar 2 at the rear of a vehicle securing the truck to a stationary support such as a vertical wall adjacent a loading dock (not shown). It will be apparent that the device may also be configured to be secured to a horizontal surface of a roadway at its base with a suitable frame 12 if desired.

The restraint device has a rectangular frame 12 having two vertical tracks 11 of C-shaped steel members and a series of mounting brackets 13 with holes for securing the frame to the stationary wall with anchor bolts for example.

FIG. 1 shows the suspended carriage 9 mounted with rollers 10 to roll on the tracks 11 vertically relative to the stationary tracks 11. The suspended carriage 9 has a forwardly extending arm 14 and upwardly extending post 15 to form a hook 1. The hook 1 can engage the underside and forward side of the ICC bar 2 and restrain forward movement of the ICC bar 2 and hence the entire truck when securely engaged.

FIGS. 2-3 show the components of the vertical motion actuator mounted to the frame 12 as follows. The master carriage 8 is slidably mounted to the suspended carriage 9 with vertical slides 16. The master carriage 8 engages the suspended carriage 9 through compression of the springs 7 for moving the suspended carriage 9 between a lowermost retracted position (FIGS. 1-4) and an uppermost engaged position where the hook 1 engages a forward surface of the horizontal ICC bar 2.

Figure 4:
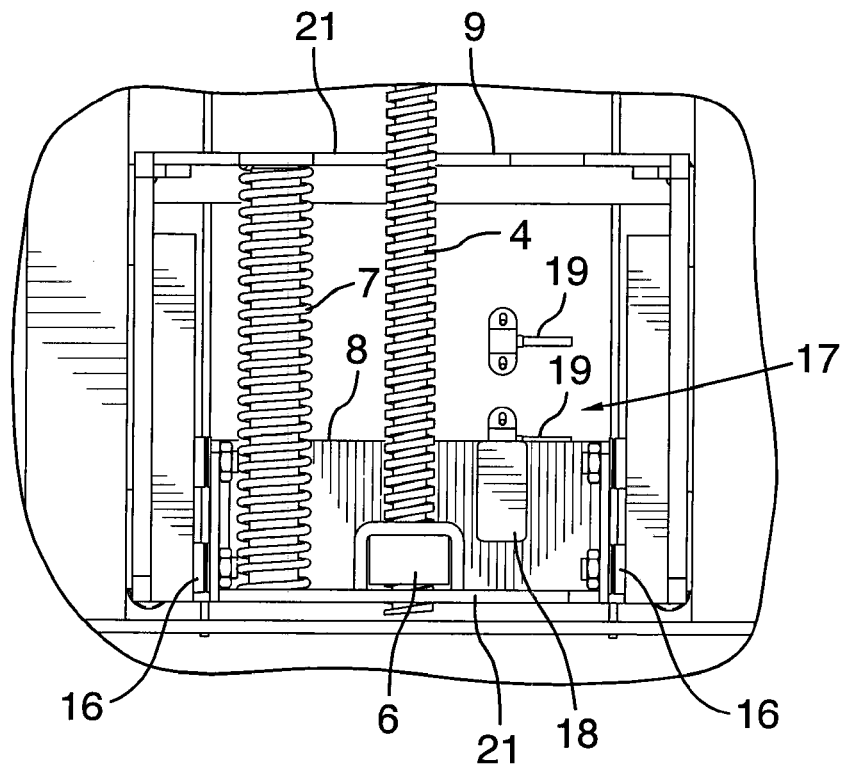
FIG. 4 shows a detail of the encircled area of FIG. 2 with the hook in a retracted position, with right side spring removed for clarity, and the master carriage fully downward such that the spring is shown at its maximum height extended or at the maximum of the spring's resilient range of motion.
Figure 5:
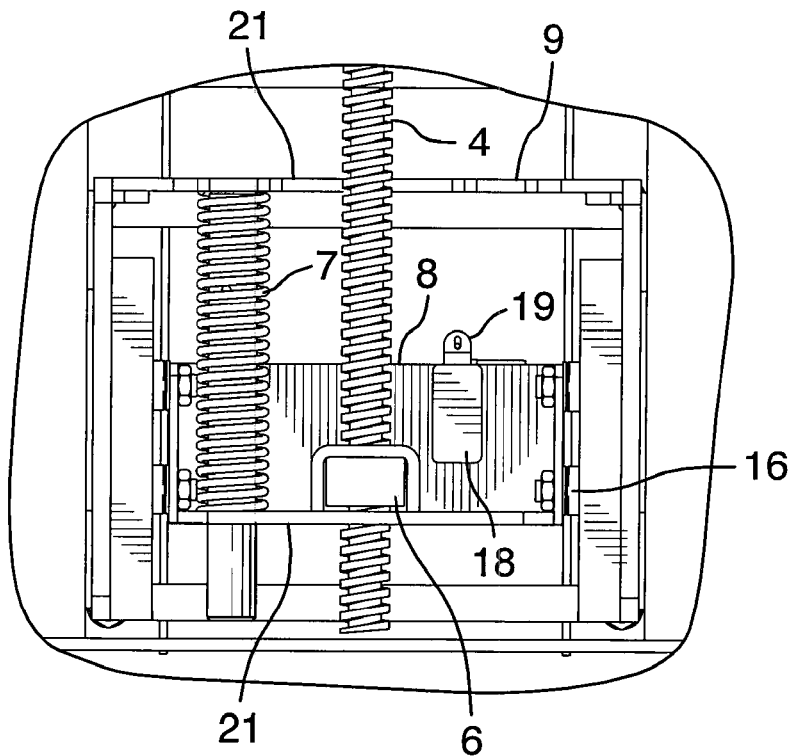
FIG. 5 is a like detail as FIG. 4 except showing the spring compressed to one half of its resilient range of motion.
Figure 6:
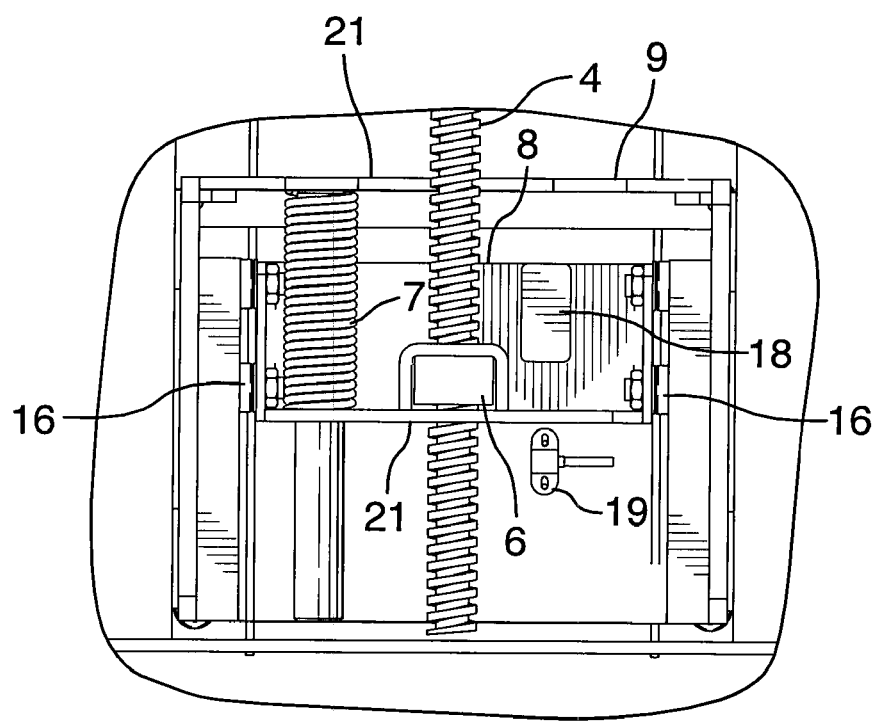
FIG. 6 shows a like detail as FIGS. 4-5 except showing the spring fully compressed to the end of its resilient range of motion being of minimum height.

The resilient suspension members shown as springs 7 are disposed to be compressed between the master carriage 8 and the suspended carriage 9. The compression springs 7 have a resilient range of travel as indicated by FIGS. 4-6 in sequence from the least to most compressed states. By means of the springs 7 the suspended carriage 9 is capable of vertically floating relative to the master carriage 8 within the range of travel of the springs 7. In the example illustrated, the resilient suspension member comprises two coil springs 7 disposed between opposing flanges 21 of the master carriage 8 and the suspended carriage 9.

For example the springs 7 may have a maximum 4 inch range of travel so that the suspended carriage 9 may easily float ±2 inches up or down relative to the master carriage 8 as the truck suspension allows movement of the truck bed with the ICC bar attached during loading or unloading without disengaging the hook 1 from the ICC bar 2. The truck bed and ICC bar 2 may move vertically as forklift trucks pass on and off the truck bed. Also as the truck is loaded or unloaded the truck suspension moves down or up respectively. The springs 7 and combination of the master carriage 8 and suspended carriage 9 allow for a limited degree of vertical motion of the truck bed and ICC bar 2 while retaining secure connection with the ICC bar 2. Since air-ride shocks of the truck tend to compress and expand depending on the weight of the forklift passing on and off the truck bed, some movements are temporary due to on/off traffic and some movements are long term due to added loads on the truck bed.

The control system for the device is preferably electronic and housed inside the adjacent building along with other controls for the dock leveler and door controls. As noted above, the truck restraint device may be provided alone or may be combined with door and dock leveling equipment, in which case the control systems are also conveniently combined.

Referring to FIGS. 4-6, the control system of the truck restraint device includes a suspended carriage position sensor 17 which in the illustrated example is shown as a magnet 18 on the master carriage 8 and two vertically spaced apart Hall effect sensors 19. Other suspended carriage position sensors 17 can be used such as limit switches, optical sensors, linear encoders etc positioned on at least one of: the master carriage 8; and the suspended carriage 9 for determining the position of the suspended carriage 9 relative to the master carriage 8.

The control system also includes a processor in communication with the position sensor 17 and the electric motor 3 of the vertical motion actuator that: determines when the suspended carriage 9 has engaged the horizontal bar 2 by measuring the relative distance between the suspended carriage 9 and the master carriage 8. After a programmable time delay, the processor then produces a signal command to the electric motor 3 of the vertical motion actuator to move the master carriage 8 relative to the suspended carriage 9 by a predetermined distance through rotation of the threaded lead screw 4. The time delay is provided to determine whether the up/down movement of the ICC bar is temporary or more permanent. The magnet 18 and Hall effect sensors 19 provide the processor with position information in real time so that the processor can accurately determine the position and activate the electric motor 3 until the predetermined distance of travel is obtained.

The suspended carriage position sensor 17 includes a lower Hall effect sensor 19 and an upper Hall effect sensor 19. The processor determines when the suspended carriage 9 has engaged the horizontal ICC bar 2 by detecting that the magnet 18 is adjacent the lower Hall effect sensor 19 as shown in FIG. 4. The processor determines when the suspended carriage 9 has moved a distance equal to the resilient range of travel of the springs 7 by detecting that the magnet 18 is adjacent the upper Hall effect sensor 19 as shown in FIG. 6.

To ensure that the springs 7 are able to compensate for vertical movement of the truck and ICC bar 2, the processor produces a signal command to the electric motor 3 of the vertical motion actuator to move the master carriage 8 relative to the suspended carriage 9 by a predetermined distance. The predetermined distance is calculated to position the master carriage 8 relative to the suspended carriage 9 in a middle zone of the resilient range of travel of the springs 7. The middle zone comprises 25 to 75%, or preferably 45 to 55% of the resilient range of travel of the springs 7.

As seen in FIG. 1, the control system includes optical sensors 20 disposed in at least one of: the rearward face of the hook 1; and a forward face of the suspended carriage 9. The processor communicates with the optical sensors 20 and has an alarm circuit, so that the processor produces an alarm signal to the alarm circuit when the position sensor 17 determines that relative motion between the master carriage 8 and the suspended carriage 9 has occurred combined with a failure to detect the presence of the ICC bar 2 by the optical sensors 20. The optical sensors 20 can include infrared sensors, or can include an optical transmitter and an opposing optical receiver. The alarm notifies the operator that engagement of the ICC bar 2 has not been properly achieved and that inspection is required or the wheels of the truck must be otherwise secured with chocks. For example if the truck is not close enough to the device, the post 15 of the hook 1 may engage the underside of the ICC bar 2. However if the ICC bar 2 is not detected by the optical sensors 20 in the throat of the hook 1, then an alarm notifies the operator that the truck is not secured.

The above description relates to a specific preferred embodiment as presently contemplated by the inventor, it will be understood that the invention in its broad aspect includes mechanical and functional equivalents of the elements described herein.

The invention claimed is:

1. A device for restraining a horizontal bar at the rear of a vehicle to a stationary support adjacent a loading dock, the device comprising:
 a frame having a vertical track and a mounting bracket for securing the frame to the stationary support;
 a suspended carriage mounted to the track for vertical movement relative to the track, the suspended carriage having a forwardly and upwardly extending member;
 a vertical motion actuator mounted to the frame and having:
  a master carriage slidably mounted to the suspended carriage, the master carriage engaging the suspended carriage for moving the suspended carriage between a lower retracted position and an upper engaged position wherein the member engages a forward surface of the horizontal bar; and
  a resilient suspension member disposed between the master carriage and the suspended carriage and having a resilient range of travel, whereby the suspended carriage is capable of vertically floating relative to the master carriage within the range of travel;
 a control system including:
  a suspended carriage position sensor on at least one of: the master carriage; and the suspended carriage for determining the position of the suspended carriage relative to the master carriage; and
  a processor in communication with the position sensor and the vertical motion actuator that: determines when the suspended carriage has engaged the horizontal bar by measuring the relative distance between the suspended carriage and the master carriage; and produces a signal command to the vertical motion actuator to move the master carriage relative to the suspended carriage by a predetermined distance.

2. The device according to claim 1, wherein the frame comprises a pair of tracks and the suspended carriage is disposed between the pair of tracks.

3. The device according to claim 2, wherein the suspended carriage has wheels mounted in the tracks.

4. The device according to claim 1, wherein the member comprises a hook having a rearward face for engaging a forward face of the horizontal bar.

5. The device according to claim 4, wherein the control system includes an optical sensor disposed in at least one of: the rearward face of the hook; and a forward face of the suspended carriage, and the processor in communication with the optical sensor and an alarm circuit, the processor producing an alarm signal to the alarm circuit when the position sensor determines that relative motion between the master carriage and the suspended carriage has occurred combined with a failure to detect the presence of the bar by the optical sensor.

6. The device according to claim 5, wherein the optical sensor comprises an optical transmitter and an optical receiver.

7. The device according to claim 5, wherein the optical sensor comprises an infrared sensor.

8. The device according to claim 1, wherein the resilient suspension member comprises coil spring disposed between opposing flanges of the master carriage and the suspended carriage.

9. The device according to claim 1, wherein the position sensor includes a Hall effect sensor disposed on one of: the master carriage; and the suspended carriage; and a magnet on the opposing one of: the suspended carriage; and the master carriage respectively.

10. The device according to claim 9, wherein the position sensor includes a lower Hall effect sensor and an upper Hall effect sensor, wherein the a processor determines when the suspended carriage has engaged the horizontal bar by detecting that the magnet is adjacent the lower Hall effect sensor.

11. The device according to claim 10, wherein the processor determines when the suspended carriage has moved a distance equal to the resilient range of travel of the suspension member by detecting that the magnet is adjacent the upper Hall effect sensor.

12. The device according to claim 1, wherein the processor produces a signal command to the vertical motion actuator to move the master carriage relative to the suspended carriage by the predetermined distance, where the predetermined distance is calculated to position the master carriage relative to the suspended carriage in a middle zone of the resilient range of travel of the suspension member.

13. The device according to claim 12, wherein the signal command is sent by the processor after a time delay to permit temporary movements during the time delay without moving the vertical motion actuator, and sending the signal command for moving the vertical motion actuator after the expiry of the time delay.

14. The device according to claim 12, wherein the middle zone comprises 25 to 75% of the resilient range of travel of the suspension member.

15. The device according to claim 14, wherein the middle zone comprises 45 to 55%; of the resilient range of travel of the suspension member.

16. The device according to claim 1, wherein the a vertical motion actuator comprises:
 a threaded lead screw rotatably mounted to the frame;
 a threaded nut fixed to the master carriage through which the lead screw passes; and
 a motor operatively engaging the threaded lead screw for rotation and communicating with the control system.

17. The device according to claim 16, wherein the threaded lead screw is vertically oriented.

18. The device according to claim 16, wherein the motor comprises an electric motor.

19. The device according to claim 16, comprising one of: a drive belt; and a drive chain engaging the motor and the threaded lead screw.

\* \* \* \* \*